United States Patent [19]
Masaki et al.

[11] Patent Number: 5,345,155
[45] Date of Patent: Sep. 6, 1994

[54] CONTROL SYSTEM FOR ELECTRIC VEHICLE

[75] Inventors: Ryoso Masaki; Yuusuke Takamoto, both of Hitachi; Sanshiro Obara, Ibaraki; Hirohisa Yamamura, Hitachiota; Hiroyuki Yamada, Katsuta, all of Japan

[73] Assignees: Hitachi, Ltd., Tokyo; Hitachi Automotive Engineering Co., Ltd., Katsuta, both of Japan

[21] Appl. No.: 857,335

[22] Filed: Mar. 25, 1992

[30] Foreign Application Priority Data

Mar. 25, 1991 [JP] Japan .................... 3-059957

[51] Int. Cl.$^5$ ........................ H02J 7/24; H02P 5/28
[52] U.S. Cl. .................... 318/138; 318/52; 318/53; 318/59
[58] Field of Search ........... 318/139, 254, 40–79, 318/800–810, 158, 143, 138; 180/233, 248, 140, 197, 249, 221; 364/426.02, 426.03, 424.03, 424.02

[56] References Cited

U.S. PATENT DOCUMENTS

| | | | |
|---|---|---|---|
| 3,584,276 | 6/1971 | Ringland et al. | 318/398 |
| 3,756,335 | 9/1973 | Eisele et al. | 318/52 X |
| 3,845,372 | 10/1974 | Ringland et al. | 318/398 |
| 3,911,340 | 10/1975 | Plunkett | 318/230 |
| 4,292,531 | 9/1981 | Williamson | 318/798 X |
| 4,363,999 | 12/1982 | Preikschat | 318/53 |
| 4,418,301 | 11/1983 | Griffith | 318/59 |
| 4,461,988 | 7/1984 | Plunkett | 318/802 |
| 5,164,903 | 11/1992 | Lin et al. | 364/426.03 |

Primary Examiner—Paul Ip
Attorney, Agent, or Firm—Antonelli, Terry, Stout & Kraus

[57] ABSTRACT

An electric vehicle control system, according to the present invention, comprises at least two electric motors for independently driving left and right wheels of the vehicle, power supply unit for supplying power to the motors, unit for detecting command entered by a driver of the vehicle and driving operational amount provided for the vehicle, unit for detecting output torques of the two motors, unit for calculating a motor speed difference command signal for making the two output torques consistent with each other, unit for calculating a vehicle speed command signal for the vehicle on the basis of detected command and the driving operational amount, unit for calculating motor speed command signals for respective of the motors on the basis of calculated motor speed difference command signal and the vehicle speed command signal, unit for detecting actual speeds of the two motors, and control unit for voltage controlling supply power from the power supply unit to the motors so that the detected actual speeds of the motors become consistent with the motor speed commands for respective motors.

7 Claims, 11 Drawing Sheets

CONTROL SYSTEM FOR ELECTRIC VEHICLE

BACKGROUND OF THE INVENTION

The present invention relates generally to a control system for an electric vehicle, which performs independent torque control for traction motors for respective left and right wheels. More specifically, the invention relates to an electric vehicle control system which can provide enhanced vehicular driving performance.

Conventionally, electric vehicle control systems have been provided for independently driving left and right vehicular wheels with a plurality of driving motors, as shown in Japanese Unexamined Patent Publications (Kokai) Nos. JP-A-62-89403, JP-A-64-133804, JP-A-1-298903. In those control systems, there are two typical control methods. Namely, the control method for the electric motor disclosed in Japanese Unexamined Patent Publication No. JP-A-63-133804 derives motor speed commands for respective left and right driving motors on the basis of an accelerator pedal depression amount, a brake pedal force, a steering angular position and so forth, to perform speed control for the driving motors. This method is characterized by smooth cornering since optimal motor speed can be obtained relative to the steering angular position, as long as the road friction coefficient is constant.

On the other hand, the control method disclosed in Japanese Unexamined Patent Publication JP- A-62-89402 varies inverter frequency depending upon a torque difference so as to electrically achieve an equivalent system to the mechanical differential gear device. Unexamined Patent Publication No. JP-A-1-298903 discloses an electric vehicle control method in which motor torque commands for the left and right traction motors are derived in accordance with the accelerator depression amount, the brake pedal force, the steering angular position and so forth as parameters, and control is performed for the output torques of the traction motors based on the motor torque commands. The later two systems are characterized in that they generally have no speed control loop. With these methods, since it can be easily realized to have a function equivalent to the differential gear device which is normally employed for the driving system employing a single motor or engine for driving both the left and right wheels, the capability of driving the vehicle in accordance with the driver's desired direction even when the road friction coefficients are different at the left and right wheels is achievable.

However, the prior art disclosed in the publications set forth above have the following problems. According to, the former method of performing speed control, when the road/tire traction at the left and right wheels are different due to a difference of the road friction coefficients or a difference of the tire pressures, the vehicle may not be driven in a straight line at the neutral steering angular position. In the second method, since the torque is controlled solely by the inverter frequency, it can perform torque control only under stead state conditions. At the transition state, this method may not perform torque control in the event of a torque difference in the transition condition during the motor driving operation, straight line stability and cornering performance of the vehicle can be degraded. Furthermore, the third method for performing torque control can cause a substantial wheel speed difference when the road friction coefficients at the left and right wheels are significantly different, such as on a muddy road, a snow covered road and so forth. Such substantial difference of the wheel speeds can lead the vehicle into spinning when the road friction coefficient is abruptly increased.

SUMMARY OF THE INVENTION

Therefore, it is an object of the present invention to provide an electric vehicle control system which can enhance vehicular drivability, such as straight line stability, cornering stability and so forth by providing uniform driving torques for respective left and right wheels including the transition state, in an electric vehicle control system having independently controlled driving motors, respectively, for left and right wheels.

Another object of the invention is to provide an electric vehicle control system for an electric vehicle, in which the left and right wheels are driven by independently controlled driving motors, capable of providing high response to steering angular variation.

A further object of the invention is to provide an electric vehicle control system for an electric vehicle, in which the left and right wheels are driven by an independently controlled driving motor, capable of preventing one of the left and right wheels from being driven at a substantially higher speed than the other wheel even on a road having significantly different road friction coefficients at the left and right wheels, such as a muddy road, a snow covered road and sliding in the mud or for other reasons so forth.

In order to accomplish the above-mentioned first object, a control system for an electric vehicle comprises at least two electric motors for independently driving left and right wheels of the vehicle, a power supply unit for supplying power to the motors, a unit for detecting a command entered by a driver of the vehicle and a driving operational amount provided for the vehicle, a unit for detecting output torques of the two motors, a unit for calculating a motor speed difference command signal for making the two output torques consistent with each other, a unit for calculating a vehicle speed command signal for the vehicle on the basis of a detected command and the driving operational amount, a unit for calculating motor speed command signals for the respective motors on the basis of a calculated motor speed difference command signal and the vehicle speed command signal, a unit for detecting the actual speeds of the two motors, and a control unit for voltage controlling the supply power from the power supply unit to the motors so that the detected actual speeds of the motors become consistent with the motor speed commands for the respective motors.

In order to accomplish the second object of the invention, a control system for an electric vehicle comprises at least two electric motors for independently driving the left and right wheels of the vehicle, a power supply unit for supplying power to the motors, a unit for detecting a command entered by a driver of the vehicle and a driving operational amount provided for the vehicle, a unit for detecting a vehicle speed of the vehicle, a unit for detecting a steering angular position, a unit for calculating torque difference command signals of the left and right motors on the basis of the detected vehicle speed and the steering angular position, a unit for detecting output torques of the two motors and for calculating a difference therebetween, a unit for calculating a motor speed difference command signal for making the difference of the two output torques consistent with the torque difference command signals, a unit for calculating a vehicle speed command signal for the vehicle on the basis of a detected command and the driving operational amount, a unit for calculating motor speed command signals for the respective motors on the basis of the calculated motor speed difference command signal and the vehicle speed command signal, a unit for detecting actual speeds of the two motors, and a control unit for voltage controlling the supply power from the power supply unit to the motors so that the detected actual speeds of the motors become consistent with the motor speed commands for the respective motors.

In order to accomplish the third object of the present invention, a control system for an electric vehicle comprises at least two electric motors for independently driving the left and right wheels of the vehicle, a power supply unit for supplying power to the motors, a unit for detecting a command entered by a driver of the vehicle and a driving operational amount provided for the vehicle, a unit for calculating torque command signals for the motors on the basis of the detected command and the driving operational amount, a unit for voltage controlling the supply power from the power supply unit to the motors so that the output torques of the motors becomes consistent with the torque command signals, a unit for detecting the actual speeds of the two motors, and a control unit for reducing the torque command signal values when a difference of the actual speeds of the motor exceeds a predetermined reference value to maintain the actual speed difference less than or equal to the reference value.

The speed command operation unit uses the depression magnitudes of the accelerator pedal and the brake pedal, namely the accelerator pedal depression amount, the brake pedal force and the steering angular position, as inputs and calculates vehicle speed command on the basis of the accelerator pedal depression amount and the brake pedal force. Also the reference speed commands for the left and right motors are derived by correcting the vehicle speed command depending upon the steering angular position. Furthermore, the speed difference command is derived on the basis of the difference of the output torques of the left and right motors. The speed commands for the respective left and right motors are derived on the basis of the reference speed commands and the speed difference command. The control unit not only controls the inverter frequency with respect to the speed command, but also feeds back the motor speeds to calculate the torque command on the basis of the speed commands and the motor speed for performing speed control for the motors. In the speed control, the torque current command is obtained on the basis of the torque command, and the magnetic flux current, i.e. energization current, is obtained on the basis of the motor speed, and the current command is thus derived through a vector operation. Furthermore, the voltage commands are provided for current control for controlling current on the basis of the current command. The control unit outputs the control pulses to the power supply unit for adjusting the supply voltages to the voltage commands. Respective power supply units generate the output voltage for supplying the motors. By this, the output voltages are generated from the motors to drive the left and right wheels.

Here, the operation will be discussed when the road friction coefficients are different at the left and right wheels. For example, when the road friction coefficient at the left wheel is higher than that of the right wheel under straight driving conditions, the output torque at the left wheel becomes greater than the output torque of the right wheel. The control unit detects the output torque difference and reduces the speed command for the left motor so as to reduce the torque difference. Since the motor speeds are feedback in the speed control, high response torque control can be achieve even in the transition.

On the other hand, in order to accomplish the second object, the following operation is performed. At first, in the torque difference operation unit, the vehicle speed of the automotive vehicle and the steering angular position are input to calculate an optimal torque difference command for cornering of the vehicle. The speed command operation unit derives the output torque difference of the left and right motors and then derives the speed difference command on the basis of the difference of the torque difference command and the output torque difference. The speed commands for the left and right motors are derived on the basis of the reference speed command and the speed difference command. The control unit feeds back the motor speeds with respect to the speed commands to derive the torque command on the basis of the difference between the speed commands and the motor speeds to perform speed control With such an operation, the torque difference of the left and right motors are made consistent with the torque commands with high response.

Furthermore, in order to accomplish the third object, the following operation is performed. The control unit receives the depression magnitude of the accelerator pedal and the brake pedal, i.e. the accelerator depression amount and the brake pedal force, as well as the steering angular position. The torque command for the vehicle is derived on the basis of the accelerator depression amount and the brake pedal force. The torque command for the left and right motors can be derived by correcting the torque command for the vehicle depending upon the steering angular position. Based on the output torque difference of the left and right motors, the speed difference command is calculated. With respect to the torque commands, a torque control operation is performed so that respective motors may generate corresponding torques. As a result of this torque control operation, the current command is derived to drive the motor. Next, when one of the driving wheel sticks in the mud or snow to cause of the vehicle spinning, the motor corresponding to the sticking wheel is accelerated to raise the revolution speed. The control unit compares the difference of the motor speeds of the left and right motors, so that when the motor speed difference exceeds a preset speed difference limit value, a judgment is made that the road friction coefficients at the left and right wheels are different in significant level to reduce the motor torque command. By this, the output torque of the motor is lowered to suppress the motor speed and thus the motor speed difference of the left and right motors is reduced to within the speed difference limit range.

DESCRIPTION OF THE PREFERRED EMBODIMENTS

Figure 1:
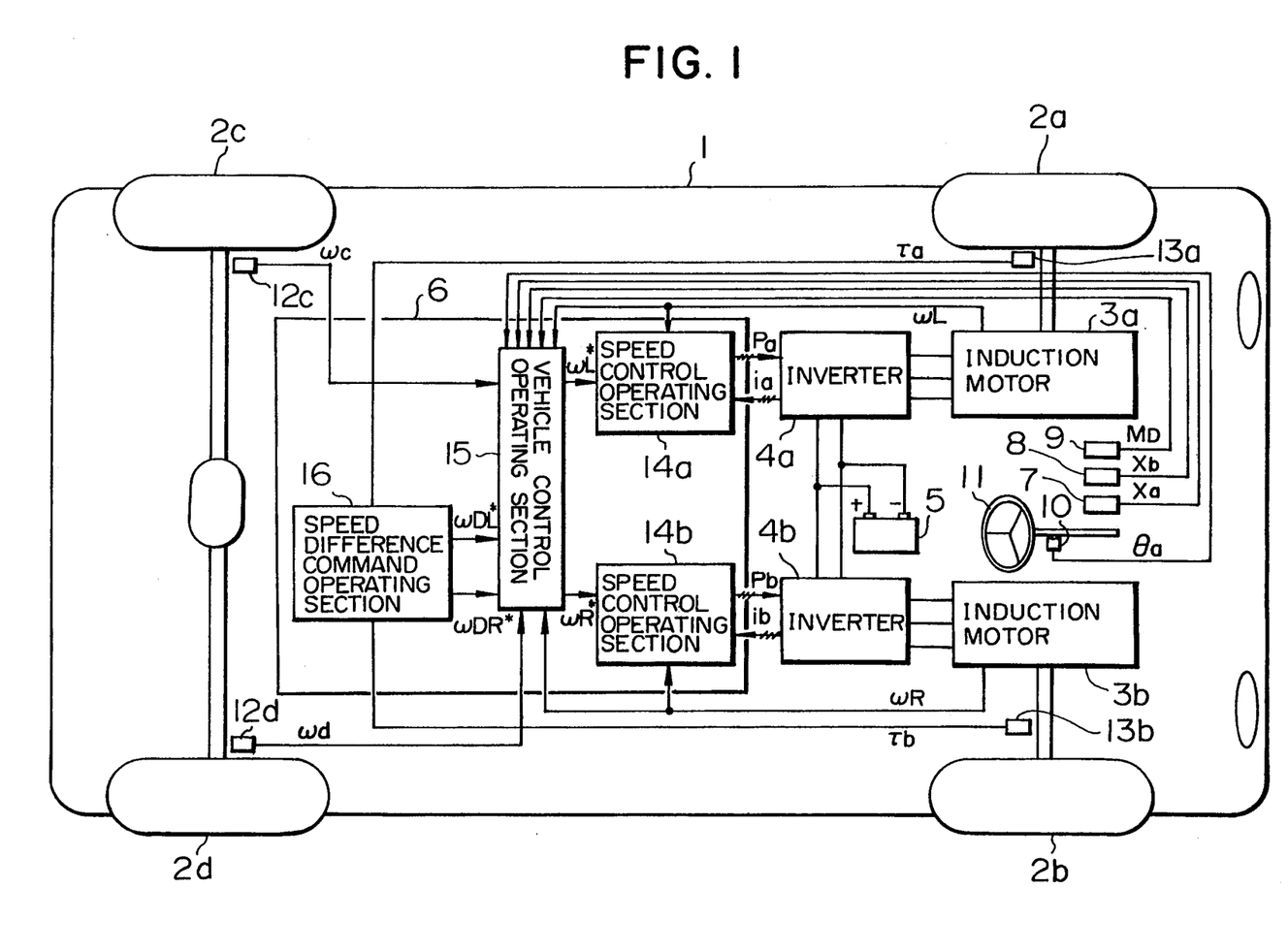
FIG. 1 is a block diagram showing one embodiment of an electric vehicle control system according to the present invention, in which the front wheels of an electric vehicle are driven by induction motors independently controlled by speed control.

Hereafter will be discussed the preferred embodiments of the present invention. FIG. 1 shows an embodiment of an electric vehicle control system according to the present invention, which is applied for an electric vehicle having front left and front right wheels driven by induction motors operating as driving motors, independent of the other. Front left and front right wheels $2a$ and $2b$ of an electric vehicle 1 are respectively connected to induction motors $3a$ and $3b$ which are driven independently by inverters $4a$ and $4b$. These inverters $4a$ and $4b$ are controlled by PWM pulses Pa and Pb (the PWM pulses $P_a$ and $P_b$ of respective U, V and W phases are quoted as $P_{au}$, $P_{av}$, $P_{aw}$, $P_{bu}$, $P_{bv}$, $P_{bw}$) for converting the direct current of a battery into an alternating current. A control unit 6 which generates the PWM pulses $P_a$ and $P_b$, receives an accelerator pedal depression amount $x_a$ and a brake depression force $x_b$ of an accelerator pedal 7 and a brake pedal 8. The control unit 6 further receives a mode signal $M_D$ of a driving mode lever 9 for allowing a driver to command forward, reverse and parking mode of operation, a steering angular position $\theta_s$ detected by a steering angle sensor 10 associated with a steering wheel 11, wheel speed signals $\omega_c$ and $\omega_d$ of encoders $12c$ and $12d$ representative of rotation speeds of the rear left wheel $2c$ and the rear right wheel $2d$, motor speeds $\omega_L$ and $\omega_R$ of the induction motors $3a$ and $3b$, output torques $\tau_a$ and $\tau_b$ of type induction motors $3a$ and $3b$ detected by torque detectors $13a$ and $13b$, and motor currents $i_a$ and $i_b$ (the motor current $i_a$ and $i_b$ at respective U, V and W phases are respectively indicated as $i_{au}$, $i_{av}$, $i_{aw}$, $i_{bu}$, $i_{bv}$, $i_{bw}$) fed back for current control. The control unit 6 comprises speed control operating sections $14a$ and $14b$ for performing speed control for the induction motors $3a$ and $3b$, a vehicle control operating section 15 for performing vehicle control operation on the basis of the accelerator pedal depression amount $x_a$, the brake pedal force $x_b$, the steering angular position $\theta_S$ and so forth, and for outputting speed commands $\omega_L*$ and $\omega_R*$, and a speed difference command operating section 16 which forms the particular feature of the present invention and controls the output torques $\tau_a$ and $\tau_b$ of the induction motors $3a$ and $3b$ to be consistent with each other.

Figure 2:
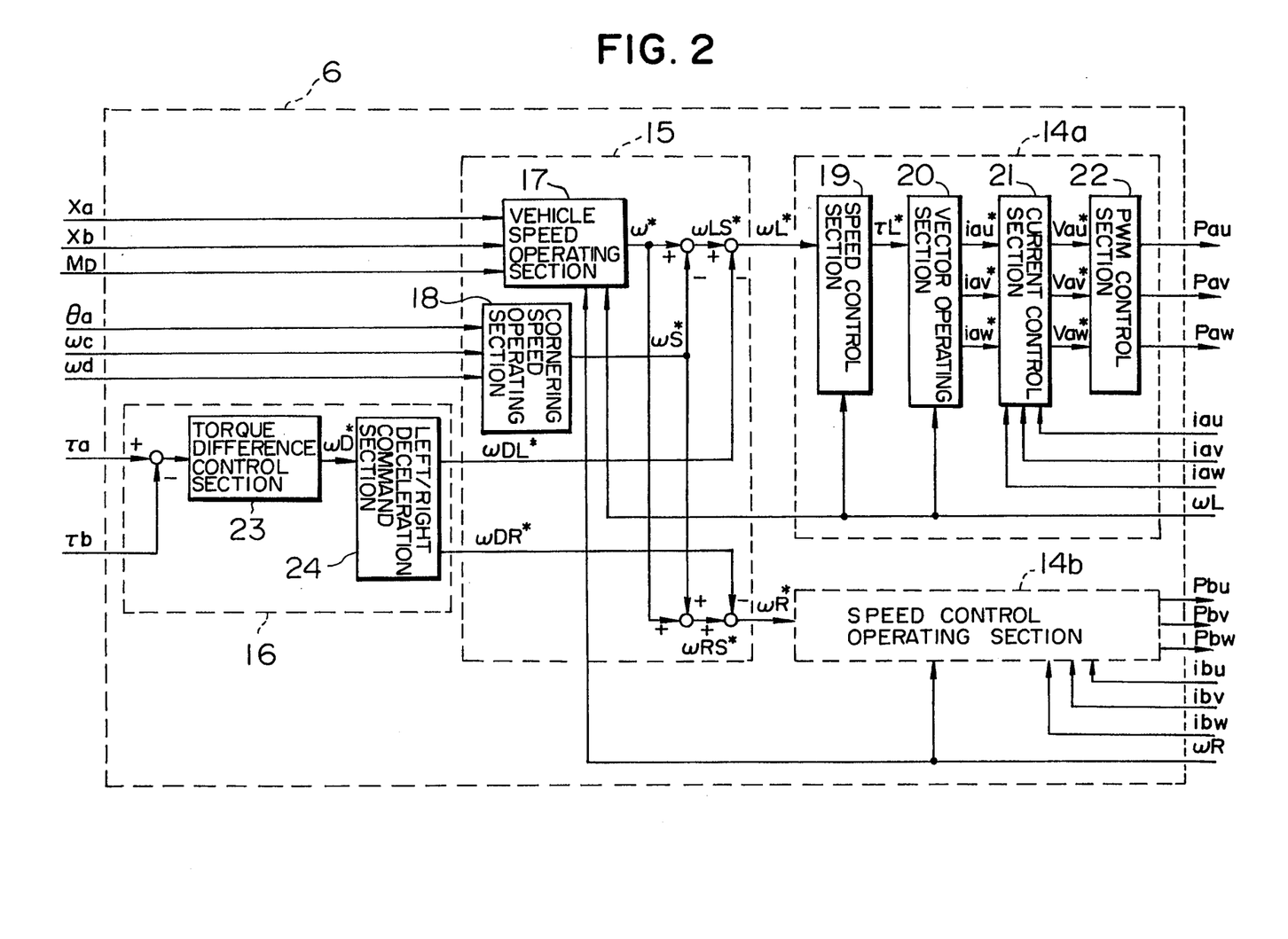
FIG. 2 is a block diagram showing control method to be performed by a control unit of FIG. 1.

The operation of the control unit 6 will be discussed hereinbelow with reference to FIG. 2. The vehicle control operating section 15 generally includes a vehicle speed operating section 17 for deriving a vehicle speed command $\omega*$, and a cornering speed operating section 18 for deriving a motor speed difference of the left and right induction motors $3a$ and $3b$ during cornering and thus deriving a cornering speed difference command $\omega_S*$. The vehicle speed operating section 17 derives the vehicle speed command $\omega*$ on the basis of the accelerator pedal depression amount $x_a$, the brake pedal force $x_b$, and the mode signal MD. The vehicle speed command $\omega*$ is designed to have a greater increasing ratio for greater accelerator pedal depression amount $x_a$. On the other hand, the increasing ratio is reduced according to the increasing average value of the motor speeds $\omega_L$ and $\omega_R$. Also, a deceleration ratio of the vehicle speed command $\omega*$ is varied depending upon the brake pedal force $x_b$. Furthermore, the value of the vehicle speed command $\omega*$ is switched between a positive value and a negative value depending upon the mode signal $M_D$. Namely, when the mode signal $M_D$ represents forward driving, the vehicle speed command $\omega*$ becomes a positive value and when the mode signal $M_D$ represents reverse driving, the vehicle speed command $\omega*$ becomes a negative value. The cornering speed operating section 18 derives the cornering speed difference command $\omega_S*$ depending upon the steering angular position $\theta_S$. Since however, a wheel speed difference between the inner wheel and the outer wheel during cornering is differentiated not only by the steering angular position $\theta_S$ but also by the vehicle speed. In order to take the vehicle speed into account in derivation of the cornering speed difference command $\omega_S*$, the wheels speed signals $\omega_c$ and $\omega_d$ of the rear left and rear right wheels $2c$ and $2d$ are input. The average value of the wheel speed signals $\omega_c$ and $\omega_d$ is used as a representation of the vehicle speed for making a correction for the cornering speed difference command $\omega_S*$. In this case, assuming that the left hand turning direction causes a positive value, the basic speed command $\omega_L*$, of the induction motor $3a$ can be derived by subtracting the cornering speed difference command $\omega_S*$ from the vehicle speed command $\omega*$. On the other hand, the basic speed command $\omega_{RS}*$ for the induction motor $3b$ can be derived by adding the cornering speed difference command $\omega_S*$ to the vehicle speed command $\omega*$. The speed commands $\omega_L*$ and $\omega_R*$ are derived by subtracting the left and right deceleration commands $\omega_{DL}*$ and $\omega_{DR}*$. Through the process set forth above, the driving condition of the automotive vehicle is detected and thus the speed commands $\omega_L*$ and $\omega_R*$ are determined.

Next, a discussion will be given for the speed control operating section $14a$ for performing motor speed control operation on the basis of the speed command. As shown in FIG. 2, the speed control operating section $14a$ includes a speed control section 19, a vector operating section 20, a current control section 21 and a PWM control section 22. The speed control section 19 performs feedback control for the motor speed $\omega_L$ by comparing the speed command $\omega_L*$ and the detected motor speed $\omega_L$ to derive a torque command $\omega_L*$ for the induction motor 3a so that the motor speed $\omega_L$ approaches the speed command $\omega_L*$. The vector operating section 20 derives a torque current component value and an energization current component value based on the torque command $\omega_L*$ and the motor speed $\omega_L$, and outputs current commands $i_{au*}$, $i_{av*}$ and $i_{aw*}$ for three phases of the induction motor 3a by rotational coordinate conversion of an orthogonal coordinates. The current control section 21 performs current feedback control for deriving voltage commands $v_{au*}$, $v_{av*}$ and $v_{aw*}$ so that the detected motor currents $i_{au}$, $i_{av}$ and $i_{aw}$ approach the current commands $i_{au*}$, $I_{av*}$ and $i_{aw*}$ corresponding to respective ones of U, V and W phases. Based on these voltage commands, the PWM pulses $P_{au}$, $P_{av}$ and $P_{aw}$ are output to the inverter 4a by the PWM control section 22. With respect to the speed control operating section 14b, similar operations based on the speed command $\omega_R*$, the motor speed R and so forth are performed to output the PWM pulses $P_{bu}$, $P_{bv}$ and $P_{bw}$.

Figure 3A:
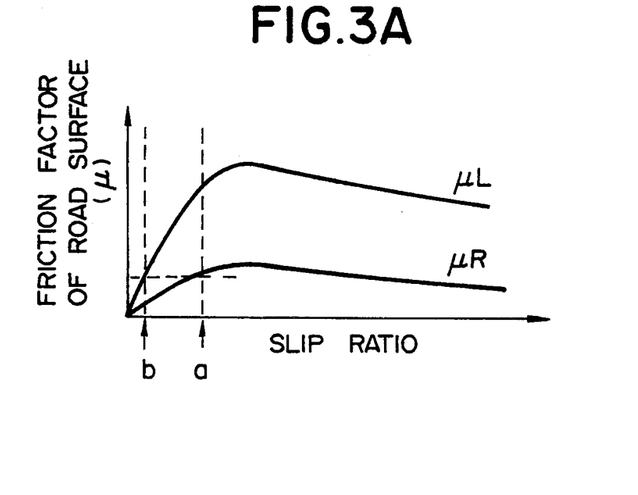
FIGS. 3A to 3C illustrates a characteristic chart of road friction coefficient for discussion of the principle for making an output torque consistent, and vector charts of output torque for driving the vehicle.
Figure 3B:
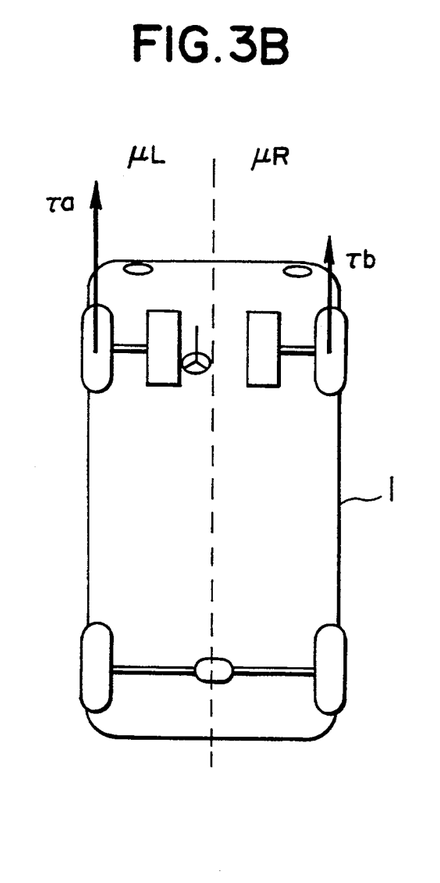

Now discussion will be given for the speed difference command operating section 16 which forms the particular feature of the invention. The speed difference command operating section 16 comprises a torque difference control section 23 and a left and right deceleration commanding section 24. Based on the output torques $\tau_a$ and $\tau_b$, a difference thereof is calculated for inputting to the torque difference control section 23. In the illustrated embodiment, the speed difference command $\omega_{D*}$ for making the output torques of the left and right induction motors consistent with each other is calculated by proportional control operation and integrating control operation or a combination thereof. In addition, if necessary, a differentiation control operation can also be combined with the above-mentioned proportional control operation and integrating control operation. The left and right deceleration command section 24 performs an operation for inputting the speed difference command $\omega_{D*}$ and outputting a left deceleration command $\omega_{DL*}$ and a right deceleration command $\omega_{DR*}$. The principle involved in making the output torque consistent will be discussed by way of example, in which the road friction coefficients $\mu_L$ and $\mu_R$ are different at the front left wheel 2a and the front right wheel 2b, with reference to FIGS. 3A to 3C. FIG. 3A is a graph showing road friction coefficient relative to a wheel slip ratio, namely a difference of the motor speed (wheel speed) and the vehicle speed. In general, the vehicle is driven at a wheel slip ratio less than or equal to the slip ratio at which the road friction coefficient becomes maximum. Here, when the vehicle 1 is running in a straight line, the left and right motor speeds $\omega_L$ and $\omega_R$ are consistent with each other, and the wheel slip ratio is the value at the point a in FIG. 3A, since the road friction coefficients $\mu_L$ and $\mu_R$ are:

$$\mu_L > \mu_R \ldots \quad (1)$$

the output torques $\tau_a$ and $\tau_b$ for driving the road surface by the front left and front right wheels 2a and 2b are $$\tau_a > \tau_b \ldots \quad (2)$$

Figure 3C:
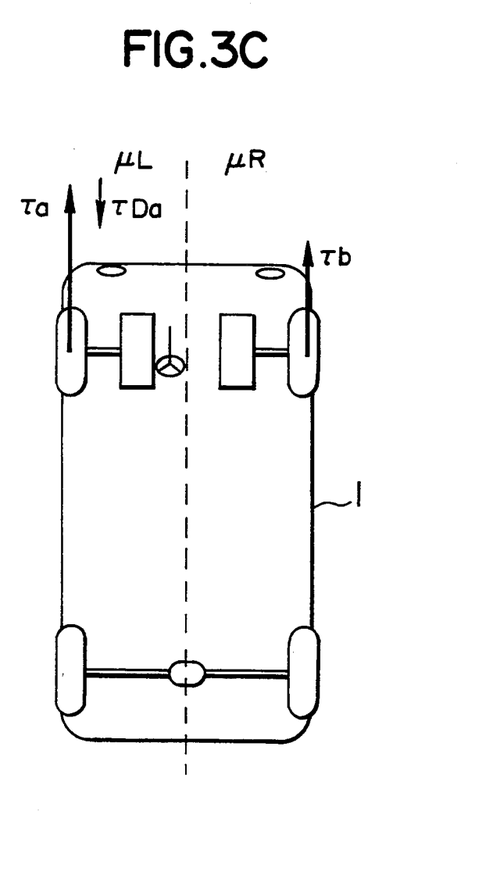

Accordingly, even when the motor speeds $\omega_L$ and $\omega_R$ are consistent, the vehicle may turn toward right due to difference of the output torques $\tau_a$ and $\tau_b$. Therefore, by shifting only the slip ratio on the front left wheel 2a, to the point b on FIG. 3A, the road friction coefficient $\rho_L$ on the front left wheel 2a becomes consistent with $\mu_R$. Namely, in order to reduce the slip ratio on the front left wheel 2a, the motor speed $\omega_L$ is reduced. At this time, by feedback controlling the difference between $\tau_a$ and $\tau_b$, the output torques $\tau_a$ and $\tau_b$ become consistent with each other. FIG. 3C shows a reduction vector $\tau_{Da}$ caused by lowering of the motor speed $\omega_L$. With this principle, the output torques $\tau_a$ and $\tau_b$ can be made consistent with each other.

Figure 4:
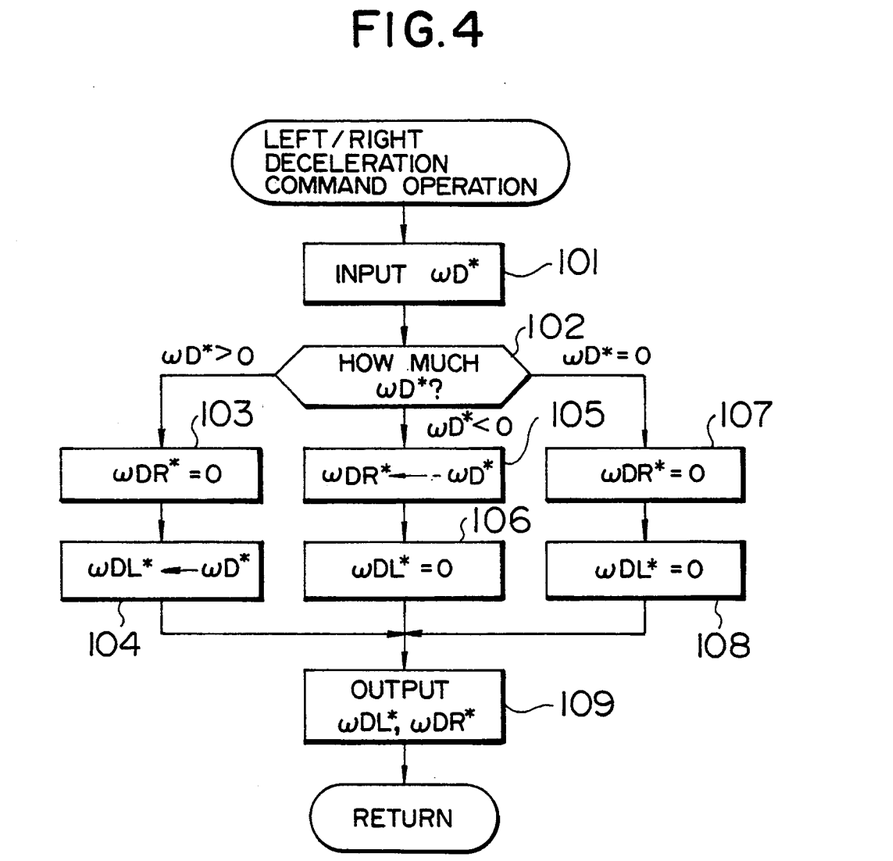
FIG. 4 is a flowchart showing processes in the left and right deceleration commanding sections.

The content of the process to be performed by the left and right deceleration commanding section 24 is shown in a form of flowchart in FIG. 4. At a step 101, the speed difference command $\omega_{D*}$ is input. Then, at a step 102, a judgement is made whether the speed difference command $\omega_{D*}$ is positive or negative. When the speed difference command $\omega_{D*}$ is positive, since the output torque $\tau_a$ of the wheel 2a is greater than $\tau_b$, it is necessary to reduce the output torque $\tau_a$ of the induction motor 3a. Accordingly, at steps 103 and 104, the left deceleration command $\omega_{D*}$ is replaced with the speed difference command $\omega_{D*}$ and the right deceleration command $\omega_{DR*}$ is replaced with zero. On the other hand, when the speed difference command $\omega_{D*}$ is negative, similarly to the above, at steps 105 and 106, the right deceleration command $\omega_{DR*}$ is replaced with the absolute value of the wheel difference command $\omega_{D*}$ and the left deceleration command $\omega_{DL*}$ is replaced with zero. After adjustment, when the output torques $\tau_a$ and $\tau_b$ becomes consistent with each other, the deceleration command becomes zero. At this time, since deceleration is unnecessary, at steps 107 and 108, both of the left deceleration command $\omega_{DL*}$ and the right deceleration command $\omega_{DR*}$ are set to zero. At a step 109, the left and right deceleration commands $\omega_{DL*}$ and $\omega_{DR*}$ are output. Since the output torques can be made consistent with each other through the process set forth above, the equivalent operation to the known mechanical differential device can be realized by speed control for two motors. Accordingly, with performing speed control for the motor, the vehicle can be driven in the desired direction with satisfactory level of safety. Furthermore, by employing the processing method in the left and right deceleration commanding section 24, since the output torques can be made consistent with each other by only deceleration of the motor speed, spinning of one side wheel on a muddy road or snow covered road can be successfully prevented. It should be appreciated that the process of the left and right deceleration commanding section 24 can be realized not only by software but also by hardware.

It should be appreciated that the shown embodiment is applicable not only for an electric vehicle having front wheel driving powering layout but for rear wheel driving, four wheel driving, and part-time four wheel driving powering layouts.

Figure 5:
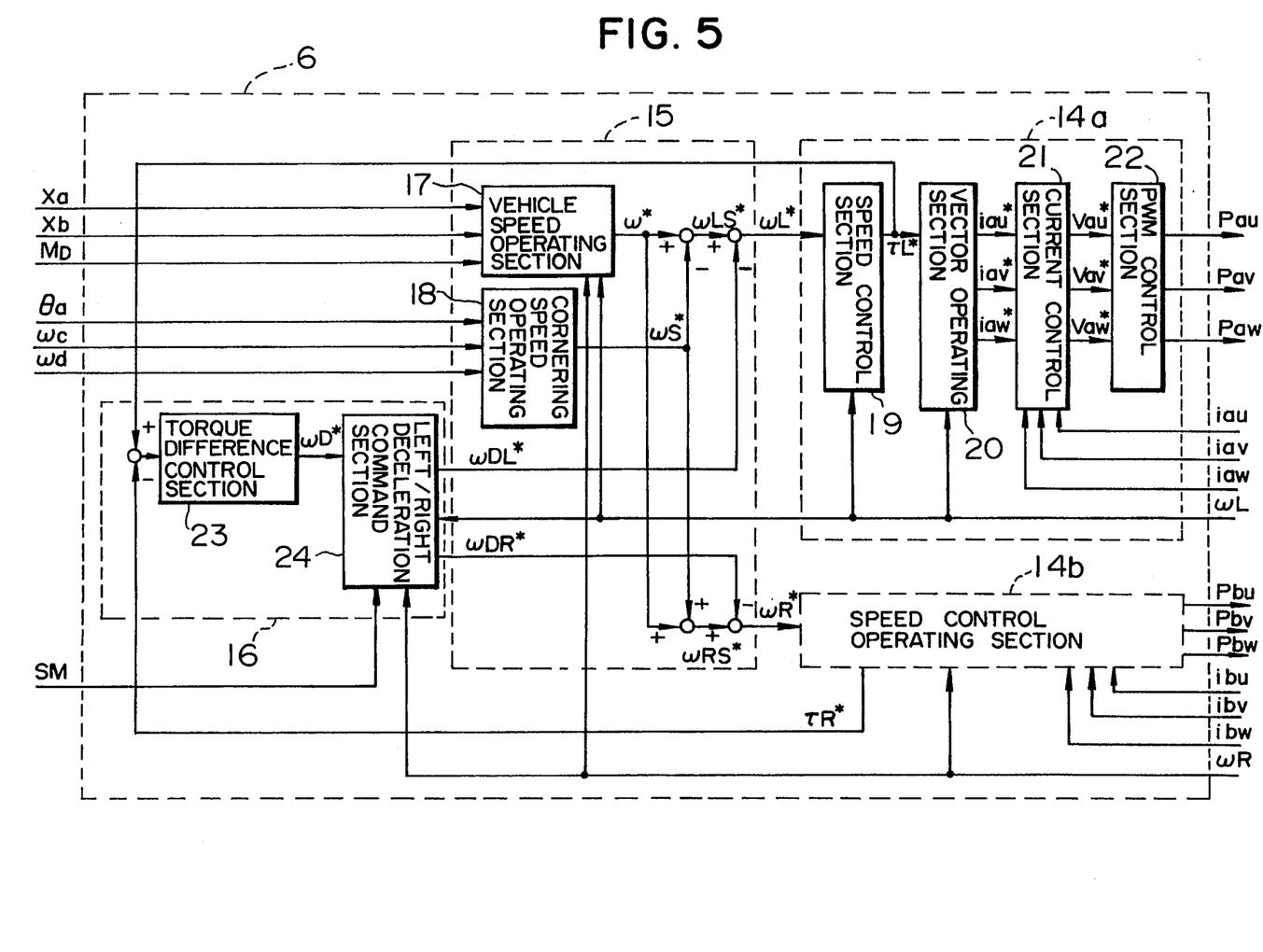
FIG. 5 is a block diagram of another embodiment of the control unit in which control is performed employing torque commands in place of the output torque of FIG. 1.
Figure 6:
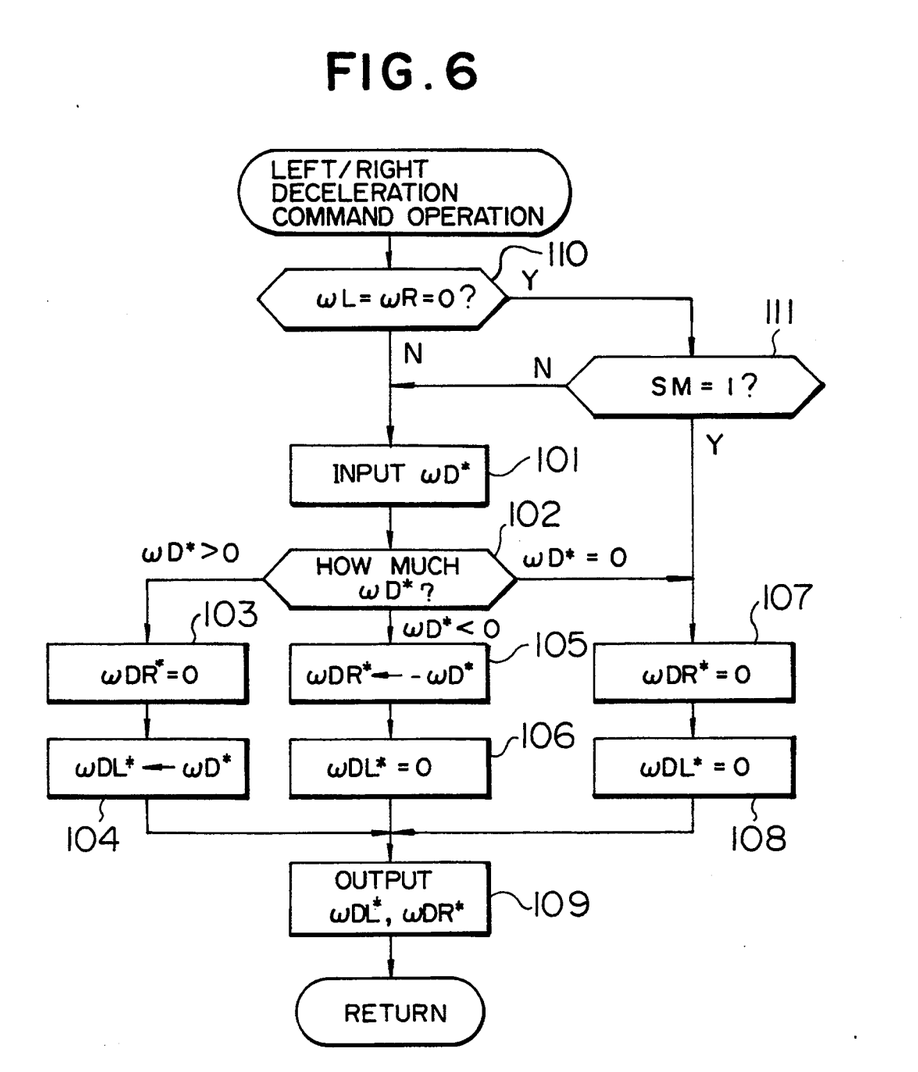
FIG. 6 is a flowchart showing a process in the left and right deceleration commanding section which is different from that of FIG. 4 and allows switching by a driver through a manual switch.

FIG. 5 shows another embodiment of the control unit in the electric vehicle control system according to the present invention, in which the torque commands and $\tau_{R*}$ are obtained from the speed control section 19 in place of the output torques $\tau_a$ and $\tau_b$. The speed control operating sections 14a and 14b perform a vector control operation for the respective induction motors, a feedback control operation for feedback controlling the motor currents, and an operation for generating the PWM pulses in the vector operating section 20, the current control section 21 and the PWM control section with respect to the derived torque commands $\tau_L*$ and $\tau_R*$. By this, the output torques $\tau_a$ and $\tau_b$ Of the induction motors 3a and 3b become approximately equal to the torque commands $\tau_L*$ and $\tau_R*$ except for the delay of control response and tolerances of the motor constant in the vector operation. In general, the response of the speed control is slower than the response of the torque control. Therefore, when the speed commands $\tau_L*$ and $\tau_R*$ are corrected based on the torque difference as in the illustrated embodiment, the delay of the torque control response may not create a substantial problem. In addition, the tolerance of the motor constant can be corrected through learning of parameters of the vector control. Therefore, even by employing the torque commands $\tau_L*$ and $\tau_R*$, the output torques $\tau_a$ and $\tau_b$ of the induction motors 3a and 3b can be made substantially consistent with each other. In the shown embodiment, for the left and right deceleration command section 24, the motor speeds $\tau_L$ and $\tau_R$ and a signal from a manual switch $S_M$ are input. The process of the output torque adjustment based on the torque commands $\tau_L*$ and $\tau_R*$ is shown in a form of flowchart in FIG. 6. As can be appreciated, the shown process is differentiated from that illustrated in FIG. 4 by the presence of steps 110 and 111. At the step 110, judgement is made of whether both of the motor speeds $\tau_L$ and $\tau_R$ are zero. If both of the motor speeds $\tau_L$ and $\tau_R$ are zero, the process jumps to the step 111. At the step 111, the input from the manual switch $S_M$ is discriminated at "1" or "0". When the manual switch $S_M$ is 1, the processes of the step 107 and succeeding steps are performed. Namely, in the processes, the left deceleration command $\omega_{DL}*$ and the right deceleration command $\omega_{DR}*$ are set to zero. This means that when the driver turns the manual switch $S_M$ to the "1" position, the torque difference control is not performed. This provides free selection of whether the torque difference control is to be performed or not by the driver through the manual switch $S_M$. Therefore, the torque difference control can be selectively performed or not performed depending upon the road condition. It should be appreciated that the switching of the manual switch $S_M$ can be done only when the motor speed is zero, which represents that the vehicle is resting. This, in turn, means that while the vehicle is running, the switching of the control operation cannot be done through the manual switch $S_M$. Therefore, even when the manual switch $S_M$ is inadvertently operated while the vehicle is running, such switching operation is ignored to maintain safety. As can be appreciated herefrom, with the illustrated embodiment, the output torques of the left and right wheels can be made consistent without the torque detectors 13a and 13b. In addition, the embodiment allows the driver to select between desired driving modes.

Figure 7:
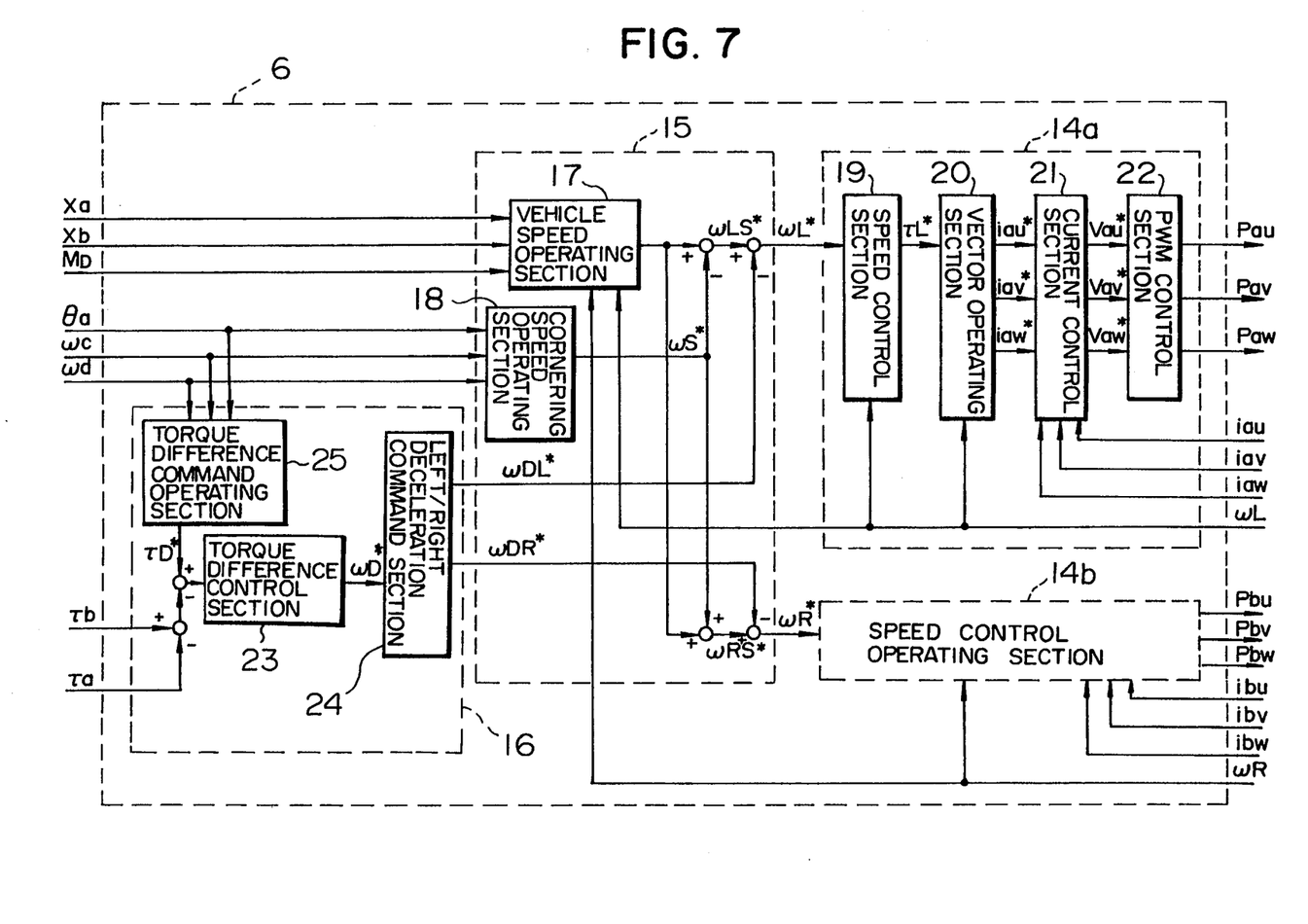
FIG. 7 is a block diagram of a further embodiment of the control unit which controls output torque difference depending upon the vehicle driving condition.
Figure 8:
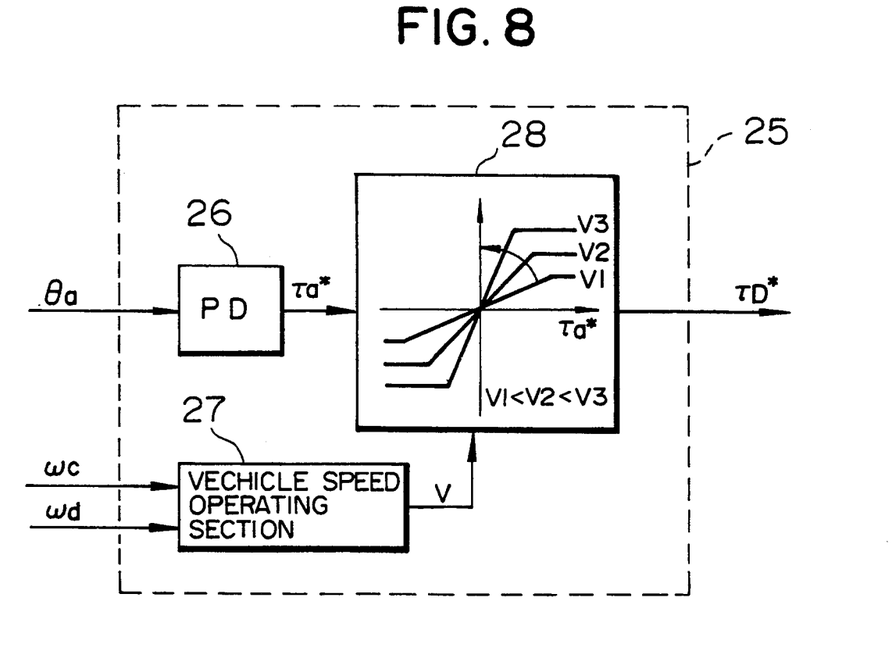
FIG. 8 is a block diagram showing an arithmetic process in a torque difference commanding section of FIG. 7.
Figure 9:
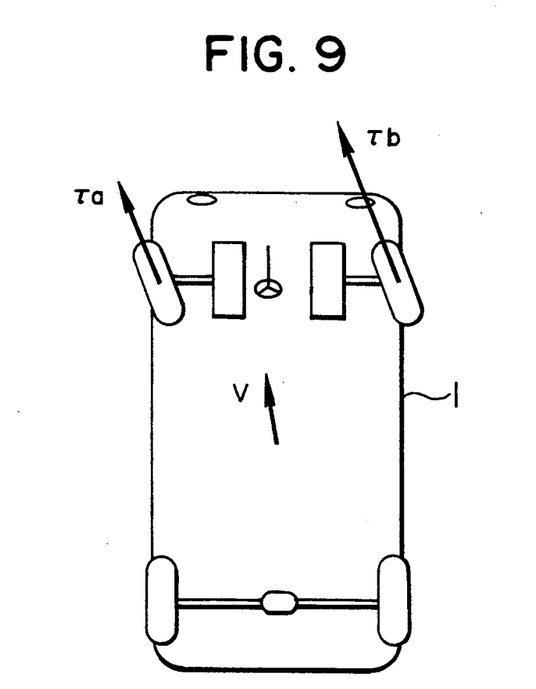
FIG. 9 is a vector chart of the output torque when a torque difference is generated upon turning in the embodiment of FIG. 7.

FIG. 7 shows another embodiment of the control unit in the electronic vehicle control system according to the invention. In relation to the embodiment of FIG. 2, the embodiment of FIG. 7 is characterized by the presence of a torque difference command operating section 25 and the torque difference control section 23 performing control of the speed difference command $\omega_D*$ depending upon the motor speeds $\omega_L$ and $\omega_R$. The torque difference command operating section 25 receives the steering angular position $\theta_S$, and the wheel speeds $\omega_c$ and $\omega_d$ of the rear left wheel 2c and the rear right wheel 2d to derive a torque difference command $\omega_D*$ based thereon. The torque difference command operating section 25 includes a steering angle dependent torque difference operation section 26, a vehicle speed operating section 27 and a vehicle speed responsive control section 28 as shown in FIG. 8. The method of process will be discussed herebelow. The steering angle dependent torque difference operating section 26 performs a control operation of proportional control, differential control or a combination thereof on the basis of the steering angular position $\theta_S$, so as to derive the steering angle dependent torque difference command $\tau_S*$. Next, the vehicle speed operating section 27 derives a vehicle speed V by deriving an average value of the wheel speeds $\omega_c$ and $\omega_d$ of the rear left and rear right wheels as driven wheels. The vehicle speed responsive control section 28 performs correction for the steering angle dependent torque difference command $\tau_S*$ based on the vehicle speed V to derive a torque difference command $\tau_D*$, as shown in FIG. 8. This is for increasing the effect of the torque difference control at a high vehicle speed range, in which higher vehicular activity control performance is required. Here, the proportional control in the steering angle dependent torque difference operating section 26 is more effective in reducing the output torque at the inner wheel than that of the outer wheel to provide higher turnability of the vehicle at the cornering. For example, as shown in FIG. 9, when the vehicle speed is V, if the steering wheel 11 is operated toward the left, the output torque $\tau_a$ of the left induction motor 3a is reduced to be smaller than the output torque $\tau_b$ of the right induction motor 3b to make the left turn easier. On the other hand, the differentiation control may provide an effect for improvement of response characteristics of the output torque relative to the steering operation. Therefore, by combining these controls, optimum drivability can be obtained.

Figure 10:
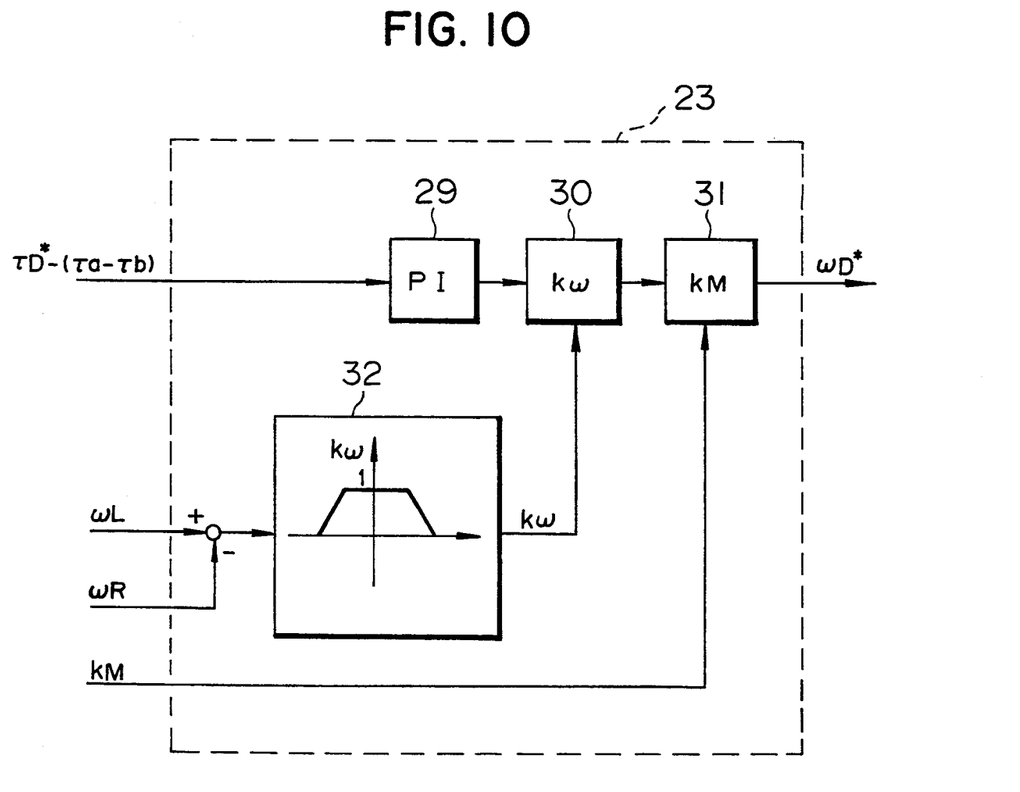
FIG. 10 is a block diagram showing a process of the torque difference control section.

The process in the torque difference control section 23 is shown in FIG. 10. In the illustrated embodiment, the torque difference control section 23 comprises a speed difference operating section 29, a speed difference limiting section 30, an external limitation section 31, and a speed difference gain operating section 32. The speed difference operating section 29 performs proportional and integral (PI) control as illustrated in FIG. 2, to output a reference speed difference command $\omega_{DO}*$. With respect to the reference speed difference command $\omega_{DO}*$, the speed difference limiting section 30 and the external limitation section 31 calculates products with speed difference gain $k\omega$ and an external gain ko to derive the speed difference command $\omega_D*$. The speed difference gain $k\omega$ is derived by the speed difference gain operating section 32 on the basis of the difference of the motor speeds $\omega_L$ and $\omega_R$ so that it is set to 1 in a range of the motor speed difference close to zero, and becomes 0 when the motor speed difference becomes in excess of a predetermined value. On the other hand, the external gain ko may be set by the driver externally in a range of 0 to 1. Accordingly, when both of the speed difference gain $k\omega$ and the external gain ko are 1, control is performed to adjust the output torque difference to a predetermined value. On the other hand, when either one of the speed difference gain $k\omega$ and the external gain ko is set to zero, the output torque difference control no longer becomes effective. Therefore, when the wheel at one side is to cause a substantial magnitude of slip, since the difference of the motor speeds $\omega_L$ and $\omega_R$ is increased to exceed the abovementioned predetermined value, the output torque difference control can be automatically terminated to perform only normal speed control. In this way, by utilizing the output torque on the other wheel which is not sticking in the mud moving of the vehicle from the location is facilitated. Accordingly, the shown embodiment may provide better controllability than the conventional mechanical limited-slip differential device. In addition, due to the characteristics of the snow covered road or muddy road, it can be the case that the vehicle cannot be move out from the stack condition only by the automatic adjustment of the effect of the torque difference control. In view of this, the illustrated embodiment allows the driver to manually adjust the effect of the torque difference control to facilitate moving out from the stick condition.

As can be appreciated herefrom, the shown embodiment can improve vehicular cornering performance and steering ability. In addition, the illustrated embodiment effectively prevents the wheel from spinning to facilitate moving out from a stuck condition.

Figure 11:
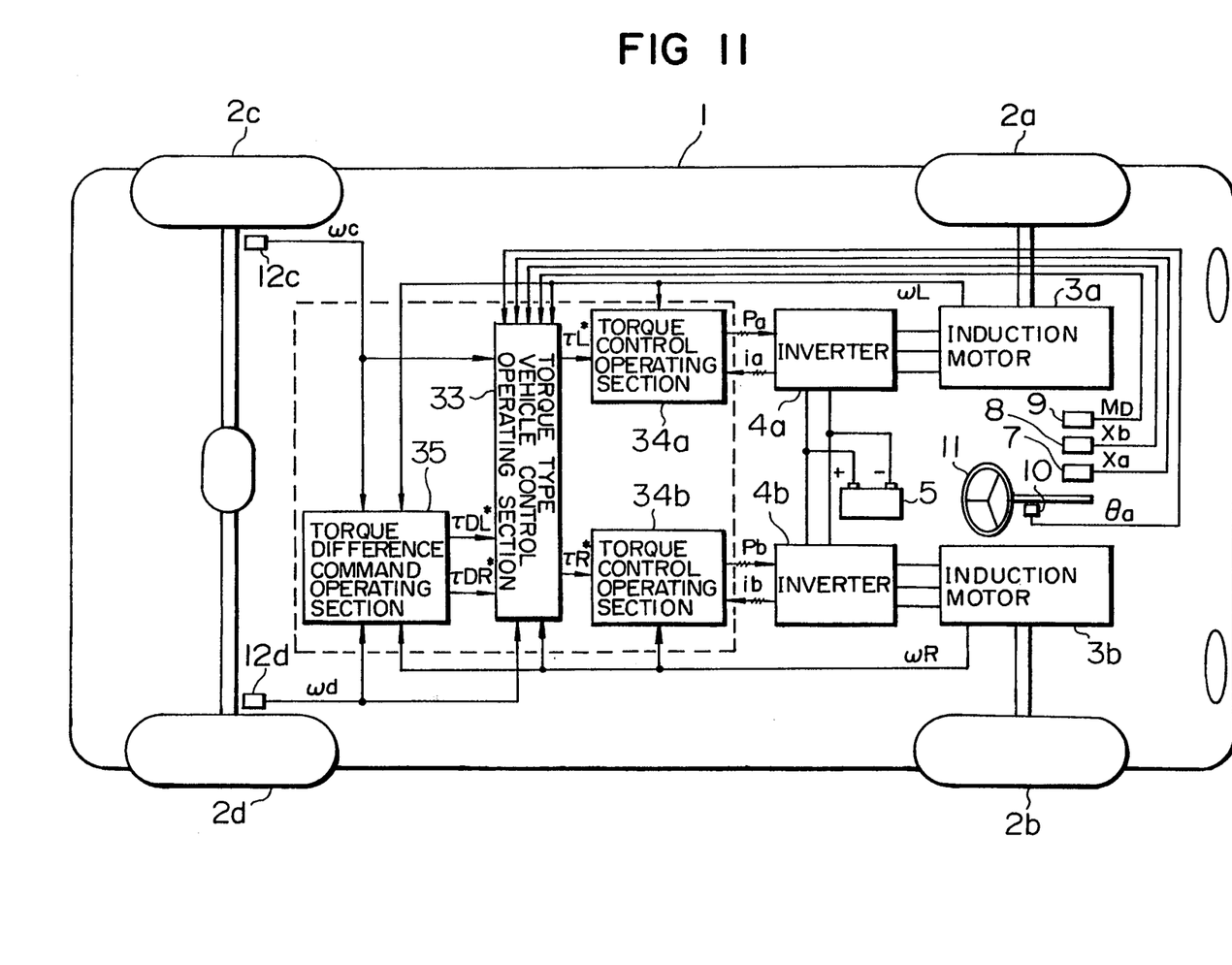
FIG. 11 is another embodiment of the electric vehicle control system according to the invention, in which the front wheels of the electric vehicle are driven by independently controlled induction motors by torque control.
Figure 12:
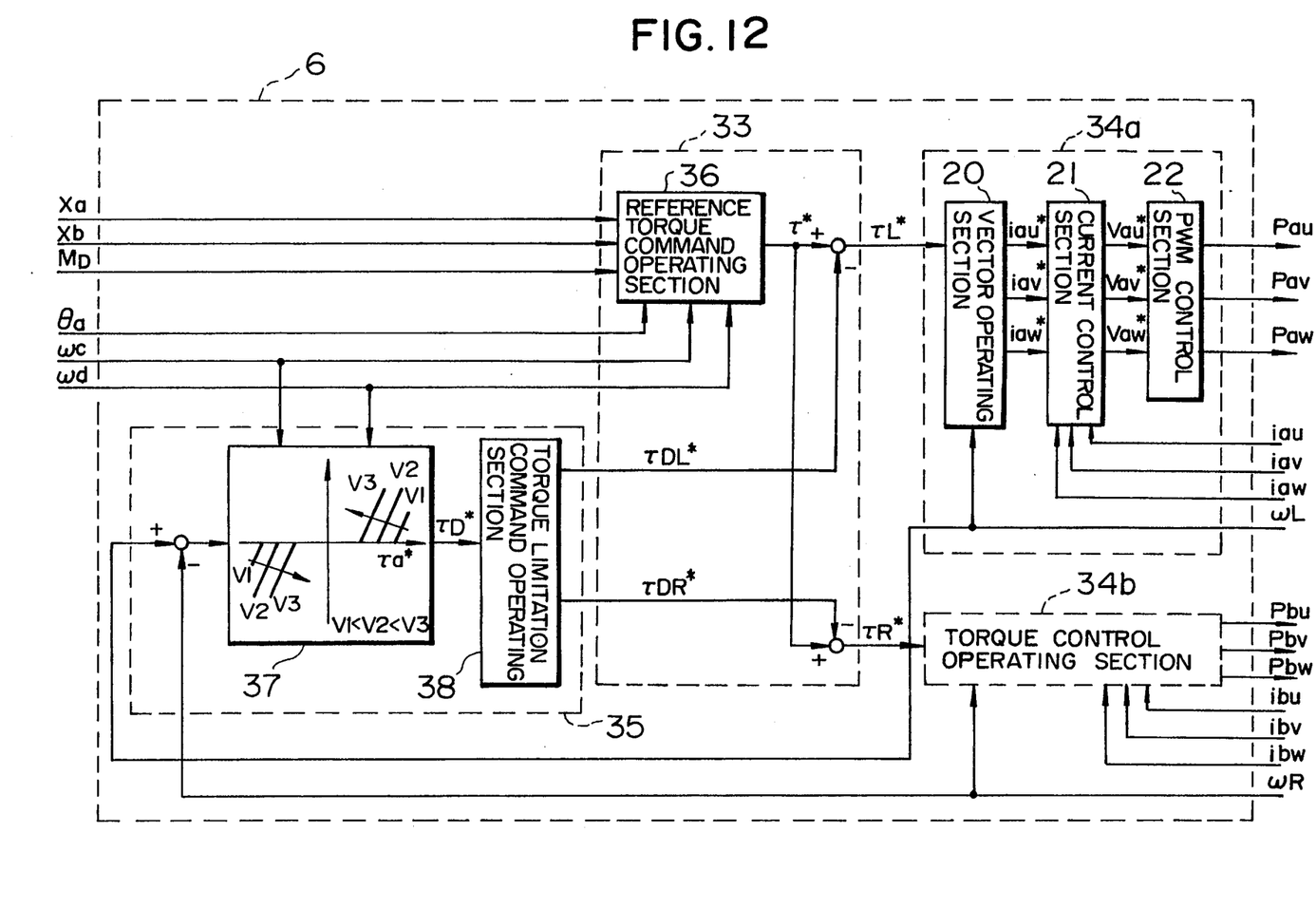
FIG. 12 is a block diagram showing the control method in the control unit of FIG. 11.

FIG. 11 is another embodiment of the electric vehicle control system according to the present invention, in which the induction motors are controlled by torque control instead of speed control as in the former embodiments. The embodiment of FIG. 11 is differentiated from the construction of FIG. 1 in absence of the torque detectors 13a and 13b. The control unit 6 includes a torque type vehicle control operating section 33, torque control operating sections 34a and 34b, a torque difference command operating section 35. The process of operation of these components is shown in FIG. 12. The torque control operating sections 34a and 34b neglect the speed control section 19 of the speed control operating sections 14a and 14b in the embodiment of FIG. 2, so that the torque commands $\tau_L*$ and $\tau_R*$ of the induction motors 3a and 3b are directly input to the vector operating section Accordingly, with respect to the torque commands $\tau_L*$ and $\tau_R*$, the induction motors 3a and 3b are controlled by open loop control. The torque type vehicle control operating section 33 includes a reference torque command operating section 36 for deriving a reference torque command $\tau*$ on the basis of the accelerator pedal depression amount $x_a$, the brake pedal force $x_b$, and the vehicle speed V as the average value of the wheels speeds $\omega_c$ and $\omega_d$ of the rear left and rear right wheels 2c and 2d. The torque type vehicle control operating section 33 subtracts a left torque limitation command $\tau_{DL}*$ and a right torque limitation command $\tau_{DR}*$ from the reference torque command $\tau*$ to derive the torque command $\tau_L*$ and $\tau_R*$. When both of the left torque limitation command $\tau_{DL}*$ and the right torque limitation command $\tau_{DR}*$ are 0, the output torques of both of the induction motors 3a and 3b are controlled toward the torque command $\tau_L*$. Therefore, substantially are equivalent operation to the mechanical differential device can be achieved.

Here, a discussion will be given for the operation method of the torque difference command operating section 35, i.e. a calculation of the left torque limitation command $\tau_{DL}*$ and the right torque limitation command $\tau_{DR}*$. The torque difference command operating section 35 receives the motor speeds $\tau_L$ and $\tau_R$ for deriving the motor speed difference, and wheel speeds $\omega_c$ and $\omega_d$ for deriving the vehicle speed are input. As shown in FIG. 12, when the motor speed difference becomes greater than a predetermined value, the torque difference command $\tau_D*$ is generated. On the other hand, during increasing of the vehicle speed V, the torque difference command $\tau_{DL}*$ is increased. By this, an excess motor speed difference at high speed range can be prevented to provide safe and stable driving of the vehicle. The torque limitation command operating section 38 makes a selection of the induction motors 3a and 3b to reduce the output torque on the basis of the torque difference command $\tau_D*$. Similarly to FIG. 4, when the torque difference command $\tau_D*$ is positive, the left torque limitation command $\tau_{DL}*$ is replaced with the torque difference command $\tau_{DL}*$ and the right torque limitation command $\tau_{DL}*$ is replaced with zero. On the other hand, when the torque difference command $\tau_D*$ is negative, the left torque limitation command $\tau_{DL}*$ is set to zero and the right torque limitation command $\tau_{DR}*$ is set to the absolute value of the torque difference command $\tau_D*$. With this method, the motor speed difference dependent control is performed to always limit the output torque, so that the safety of the vehicle can be enhanced.

With the embodiment set forth above, for the electric vehicle which includes induction motors to be basically controlled in torque control, spinning of the wheels even on a muddy road or snow covered road can be successfully prevented.

Although the foregoing discussion has been given for the embodiments, in which the front wheels are driven independently by two motors, the invention is also applicable for the electric vehicle having four wheel drive powering layout. Furthermore, the motor as the traction motor to be employed for implementation of the present invention is not requited to the induction motor, but can be any appropriate motor. Furthermore, the control unit may be implemented in a software process of a microcomputer, or may be of hardware construction.

As will be appreciated from the foregoing discussion, according to the present invention, because control is performed for reducing the speed command in relation to the speed difference of the left and right motors, and for setting the torque difference to a predetermined value, the vehicle can be driven in the desired direction even when the road friction coefficients are different at the left and right driving wheels. Furthermore, the present invention facilitates moving out from a stuck position in the mud or so forth.

What is claimed is:

1. A control system for an electric vehicle, comprising:
   at least two electric motors for independently driving left and right wheels of the vehicle;
   power supply means for supplying power to said motors;
   means for detecting command entered by a driver of the vehicle and driving operational amount provided for said vehicle;
   means for detecting output torques of said two motors;
   means for calculating a motor speed difference command signal for making said two output torques consistent with each other;
   means for calculating a vehicle speed command signal for said vehicle on the basis of detected command and said driving operational amount;
   means for calculating motor speed command signals for respective of said motors on the basis of calculated motor speed difference command signal and said vehicle speed command signal;

means for detecting actual speeds of said two motors; and control means for voltage controlling supply power from said power supply means to said motors so that the detected actual speeds of said motors become consistent with said motor speed commands for respective motors.

2. An electric vehicle control system as set forth in claim 1, which further comprises means for reducing said motor speed command for making the output torques of said motors consistent to each other.

3. An electric vehicle control system as set forth in claim 1, wherein said control means calculates motor torque commands on the basis of said motor speed command, a difference of motor speeds obtained from said motor speed detecting means, and voltage commands being derived by said control means on the basis of said motor torque command, and said voltage command being determined so that the motor torques of left and right motors of said two motors become consistent with each other.

4. An electric vehicle control system as set forth in claim 1, wherein said motors are alternating motors and said control means derives torque current commands from a difference between said motor speed commands and said actual motor speed provided by said motor speed detecting means, and a magnetic flux current command obtained from said actual motor speed, and whereby derives output voltage commands from vector sum of said torque current command and said magnetic flux current command.

5. A control system for an electric vehicle, comprising:

at least two electric motors for independently driving left and right wheels of the vehicle;

power supply means for supplying power to said motors;

means for detecting command entered by a driver of the vehicle and driving operational amount provided for said vehicle;

means for detecting a vehicle speed of the vehicle;

means for detecting a steering angular position;

means for calculating torque difference command signals of said left and right motors on the basis of the detected vehicle speed and said steering angular position;

means for detecting output torques of said two motors and calculating a difference therebetween;

means for calculating a motor speed difference command signal for making the difference of said two output torques consistent with said torque difference command signals;

means for calculating a vehicle speed command signal for said vehicle on the basis of detected command and said driving operational amount;

means for calculating motor speed command signals for respective of said motors on the basis of calculated motor speed difference command signal and said vehicle speed command signal;

means for detecting actual speeds of said two motors; and control means for voltage controlling supply power from said power supply means to said motors so that the detected actual speeds of said motors become consistent with said motor speed commands for respective motors.

6. An electric vehicle control system as set forth in claim 5, wherein said torque difference command signal calculating means derives said torque difference command signal on the basis of a difference of motor speeds of said left and right motors of said two motors.

7. An electric vehicle control system as set forth in claim 5, which further comprises torque difference calculation means for increasing said torque difference command signal according to increasing of the steering angular offset from a neutral position.

* * * * *